(12) United States Patent
Buerk et al.

(10) Patent No.: US 7,598,687 B2
(45) Date of Patent: Oct. 6, 2009

(54) METHOD AND CONTROL UNIT FOR CONTROLLING FAN MOTORS

(75) Inventors: Peter Buerk, Lichtenau-Grauelsbaum (DE); Stefan Koch, Kappelrodeck (DE); Karl Preis, Bühlertal (DE)

(73) Assignee: Robert Bosch GmbH, Stuttgart (DE)

( * ) Notice: Subject to any disclaimer, the term of this patent is extended or adjusted under 35 U.S.C. 154(b) by 116 days.

(21) Appl. No.: 10/548,908

(22) PCT Filed: Oct. 21, 2003

(86) PCT No.: PCT/DE03/03480

§ 371 (c)(1),
(2), (4) Date: Mar. 9, 2006

(87) PCT Pub. No.: WO2004/082121

PCT Pub. Date: Sep. 23, 2004

(65) Prior Publication Data

US 2006/0232230 A1    Oct. 19, 2006

(30) Foreign Application Priority Data

Mar. 13, 2003   (DE) ................................ 103 10 830

(51) Int. Cl.
H02P 7/08 (2006.01)
(52) U.S. Cl. .................... 318/66; 318/599; 318/811; 318/67; 318/77
(58) Field of Classification Search .................. 318/53, 318/66–75, 77
See application file for complete search history.

(56) References Cited

U.S. PATENT DOCUMENTS

| | | | |
|---|---|---|---|
| 5,777,897 A * | 7/1998 | Giorgio | 700/299 |
| 6,199,398 B1 * | 3/2001 | Takeuchi et al. | 62/323.1 |
| 6,262,896 B1 | 7/2001 | Stancu et al. | |
| 6,368,064 B1 * | 4/2002 | Bendikas et al. | 417/2 |
| 6,400,045 B1 * | 6/2002 | Hosokawa et al. | 307/117 |
| 6,486,632 B2 * | 11/2002 | Okushima et al. | 318/599 |
| 6,512,346 B2 * | 1/2003 | Yoshimura | 318/599 |

(Continued)

FOREIGN PATENT DOCUMENTS

DE    202 15 697 U1    1/2003

(Continued)

OTHER PUBLICATIONS

English Language Abstract of JP 3-22019.

(Continued)

*Primary Examiner*—Walter Benson
*Assistant Examiner*—Renata McCloud
(74) *Attorney, Agent, or Firm*—Kenyon & Kenyon LLP

(57) ABSTRACT

A method for controlling a first fan motor using a first pulse width modulation signal having a first pulse control factor, and for controlling a second fan motor using a second pulse width modulation signal having a second pulse control factor, so as to bring about an overall air output according to a prespecified setpoint air output by the operation of the first and the second fan motor, a low-pass filter being provided in parallel to the fan motors in order to smooth out voltage fluctuations in voltage supply lines, wherein the first and the second pulse control factor are made available independently of each other, in order to minimize the current through the low-pass filter.

5 Claims, 3 Drawing Sheets

U.S. PATENT DOCUMENTS

| | | | |
|---|---|---|---|
| 6,592,449 B2 * | 7/2003 | Cipolla et al. | 454/184 |
| 6,747,432 B2 * | 6/2004 | Yoshimura | 318/599 |
| 6,815,920 B2 * | 11/2004 | Cohen et al. | 318/599 |
| 2004/0027105 A1 * | 2/2004 | Nakamura et al. | 323/267 |

FOREIGN PATENT DOCUMENTS

| | | | |
|---|---|---|---|
| JP | 3-22019 | | 9/1991 |
| JP | 06165307 A | * | 6/1994 |
| JP | 06189593 A | * | 7/1994 |
| JP | 10008959 A | * | 1/1998 |
| JP | 2002043910 A | * | 2/2002 |

OTHER PUBLICATIONS

English Language Abstract of DE 202 15 697.

* cited by examiner

METHOD AND CONTROL UNIT FOR CONTROLLING FAN MOTORS

FIELD OF THE INVENTION

The present invention relates to a method for controlling fan motors using pulse width modulation signals. The present invention also relates to a control unit for operating fan motors.

BACKGROUND INFORMATION

Frequently, more than one fan is installed for cooling internal combustion engines, the fans being controlled via a common control unit. The fans may be controlled in almost any manner with the aid of a pulse width modulation system for the purpose of setting the extent of the power consumption of the blower. Each of the fan motors is connected to a common supply line via a switching device, preferably a field effect power transistor. The field effect power transistors are activated periodically with the aid of the pulse width modulation signal, a pulse control factor of the pulse width modulation signal specifying for which component in time of a signal period the field effect power transistor is switched through or blocked.

The periodic switching of the field effect power transistors causes voltage fluctuations on the supply line, which may have an interfering effect on the entire supply network. In order to reduce these line-connected interferences, usually a capacitor in the form of an electrolytic capacitor, is provided, which forms a low pass filter on the supply line, and which thus smoothes out the voltage fluctuations on the supply line.

Because of the switching of the field effect power transistors, the capacitor is loaded by an alternating current. The loading is essentially a function of the motor currents and the pulse control factor. Each of the fan motors causes an alternating current flow in the capacitor, as a function of the respective pulse control factor of the pulse width modulation signal by which the respective fan motor is controlled.

The alternating current flow through the capacitor loads it, the capacitor generally being heated by the current. Especially in the case of the usual application of an electrolytic capacitor, the service life of the component is considerably reduced, since, for example, the electrolyte of the electrolytic capacitor may dry up.

SUMMARY OF THE INVENTION

Therefore, it is an object of the present invention to make available a method and a device for increasing the service life of the capacitor in the case of the control of two or more fan motors.

According to a first aspect of the present invention, a method is provided for controlling a first fan motor using a first pulse width modulation signal and a second fan motor using a second pulse width modulation signal. An overall air output is produced by the operation of the first and/or the second fan motor according to a prespecified setpoint air output. Both fan motors are connected to a capacitor component for smoothing out voltage fluctuations in a voltage supply line. The position in time and/or the pulse control factors of the first and the second pulse width modulation signal are adjusted to each other, so that, at a given overall air output, an effective value of the current is minimized by the capacitor component.

In this way it may be achieved that the capacitor element is loaded with a lower current than was true up to now, so that there is less heating and consequently slower aging.

It is preferably provided that, because of the capacitor component, at certain first pulse control factors and certain second pulse control factors, the current has a local minimum in each case. In order to set the setpoint air output, the value of the first pulse control factor is fixed to one of the local minima, the second pulse control factor being selected so as to achieve the overall air output. In this way, the current given rise to by one of the fan motors is minimized by the capacitor component, and thus, a local minimum for the current is also achieved by the capacitor component for the prespecified setpoint air output. That is why the capacitor component heats up less, so that the service life of the capacitor is increased.

Preferably, the determined first pulse control factor, at which the current has a local minimum because of the capacitor component, is selected in such a way that the value of the determined first pulse control factor has as small a difference as possible from the value of the second pulse control factor. In this way it may be avoided that the control of the fan motors is very different, so that a very nonuniform overall air output would be achieved over the area to be ventilated, for instance, in the case of adjacently placed fan motors. In addition, it may thus be avoided that one of the fan motors is activated using very high power, whereas another fan motor is activated with only a very low power, whereby the wear of the fan motors is distributed unevenly.

It may also be provided that, in response to the continual change in the setpoint air output, the value of the first pulse control factor is changed, while the value of the second pulse control factor is held to a certain pulse control factor at which the current through the capacitor component has a local minimum. After the reaching of a next local minimum by the first pulse control factor, the first pulse control factor is held to the minimum reached and the second pulse control factor is changed in a manner corresponding to the change in the setpoint air output. In this way, a uniform run up or run down of the overall air output of the fan motors is achieved, one of the fan motors always being held to a constant air output, while the other fan motor, respectively, is activated corresponding to the setpoint air output. In this way, in each case one of the fan motors is controlled in such a way that the current brought about by the respective fan motor is at a local minimum because of the capacitor component.

According to another aspect of the present invention, a control unit is provided for controlling a first fan motor using a first pulse width modulation signal having a first pulse control factor and a second fan motor using a second pulse width modulation signal having a second pulse control factor. The control unit receives a setpoint air output value and generates the first and the second pulse width modulation signal. A capacitor component is connected to the fan motors for smoothing out voltage fluctuations in a voltage supply line. The control unit is designed in such a way as to adjust the positions in time and the pulse control factors of the first and the second pulse width modulation signal to one another in such a way that, at a given setpoint air output, a current is minimized by the capacitor.

In this way, a control unit may be made available that, with the aid of a first and a second pulse width modulation signal, controls a first and a second fan motor, so that the current may be minimized as much as possible by a capacitor component connected to both fan motors.

Preferably, the control unit may have an allocation device in which the first and the second pulse control factor is allocated to each setpoint air output value. The allocation device may, for instance, be a table in which the pulse control factors are allocated to each setpoint air output. The allocation device may also, according to a calculation formula, ascertain the first and the second pulse control factor from each setpoint air output value. This has the advantage that, in the case of a nonlinear dependence between the pulse control factors and the setpoint air output values, the setpoint air output may be set exactly by the pulse control factors.

DETAILED DESCRIPTION

Figure 1:
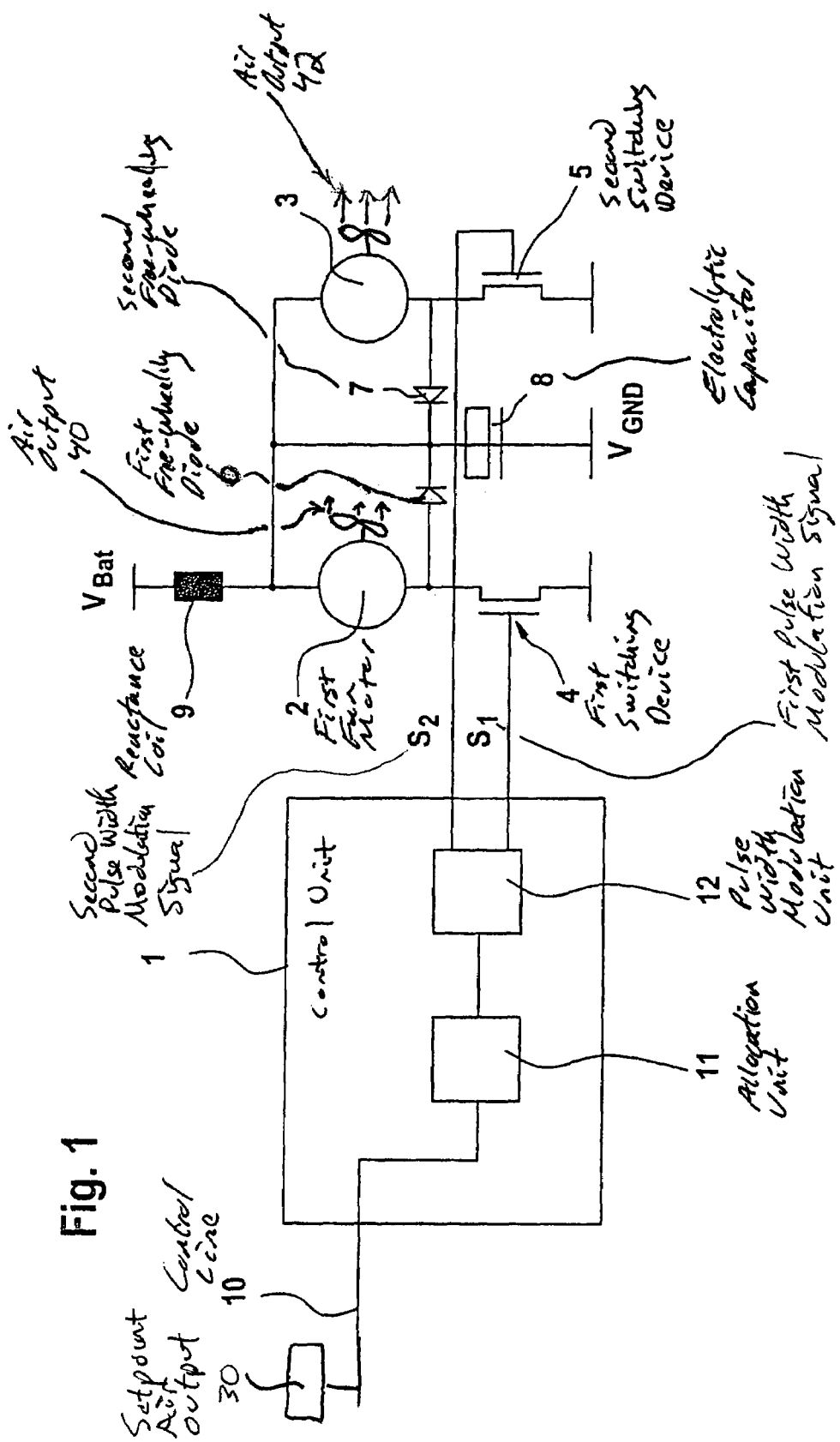
FIG. 1 a circuit diagram for a fan system according to a preferred specific embodiment of the present invention.

FIG. 1 shows a circuit diagram of a fan system according to a preferred specific embodiment of the present invention. The ventilator system has a control unit 1 which emits a first pulse width modulation signal S1 to control a first fan motor 2, and a second pulse width modulation signal S2 to control a second fan motor 3. The first pulse width modulation signal S1 is applied to a first switching device 4 and the second pulse width modulation signal S2 is applied to a second switching device 5. Switching devices 4, 5 are preferably developed as field effect power transistors.

Field effect power transistors 4, 5 are switched through or blocked according to the respective first or second pulse width modulation signal S1, S2. Pulse width modulation signals S1, S2 are periodic, a respective pulse control factor specifying shared time duration within the period duration the respective switching device 4, 5 is switched through.

First field effect power transistor 4 is connected in series with first fan motor 2, so that, via the first fan motor 3 during a switched-through first switching device 4, a supply voltage $V_{Bat}$ is applied, and first fan motor 2 being separated from supply voltage $V_{Bat}$ when first switching device 4 is switched off.

The same applies for second fan motor 3. Depending on the state of pulse width modulation signal S2 that is applied to second field effect power transistor 5, second field effect power transistor 5 is switched through or not, and thereby applies supply voltage $V_{Bat}$ to second fan motor 3 or separates supply voltage $V_{Bat}$ from second fan motor 3.

When field effect power transistors 4, 5 are switched off, in order to draw off the free-wheeling voltages created in fan motors 2, 3, a first free-wheeling diode 6 and a second free-wheeling diode 7 are provided.

Between a first supply voltage potential $V_{BAT}$ that is applied at respectively first connection terminals of fan motors 2, 3 and a second supply voltage potential $V_{GND}$, which preferably is a ground potential, a common capacitor in the form of an electrolytic capacitor 8 is provided. Electrolytic capacitor 8 is used as a low-pass filter and smoothes out the voltage fluctuations that occur on the supply voltage lines. The voltage fluctuations result from switching on and switching off switching devices 4, 5. In addition, for smoothing out the voltage fluctuations of the supply voltage lines, a reactance coil 9 may be provided which is connected to the first connection of fan motors 2, 3 and the high supply voltage potential $V_{BAT}$.

Fan motors 2, 3 are used, for instance, for ventilating a cooling system, whereby a common overall air output is to be achieved. The air output 40, 42 of fan motors 2, 3 is variable and may be set independently of each other, and is determined according to a respective setpoint air output 30, which is predefined by a setpoint air output value via a control line 10.

Electrolytic capacitor 8 is usually the fastest aging component in the overall system, the aging being accelerated considerably by the heating up of electrolytic capacitor 8. During the switching on and switching off of field effect power transistors 4, 5, a voltage fluctuation is brought about on the supply lines, which leads to a current flow in electrolytic capacitor 8.

Figure 2A:
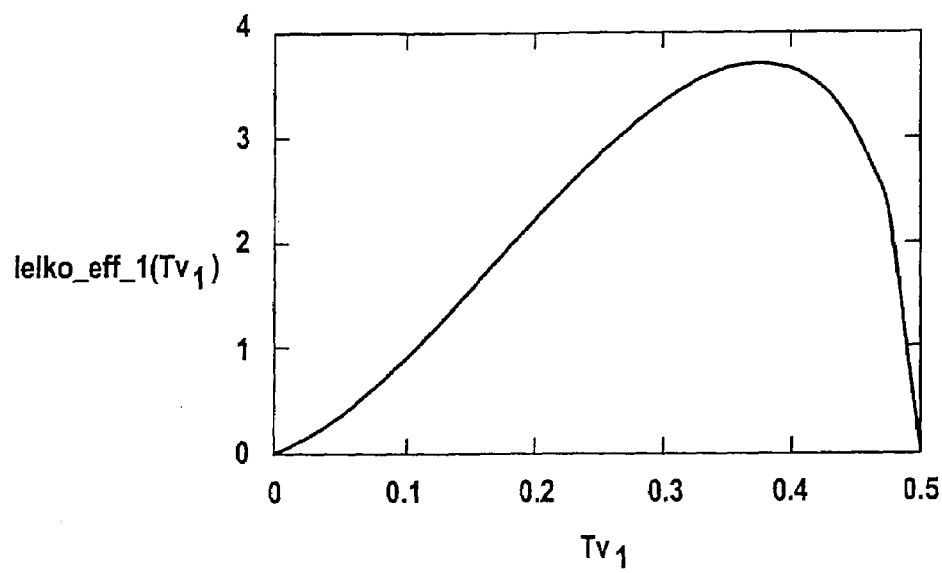
FIGS. 2A, 2B functional curves for the current through the capacitor component as a function of the pulse control factor.
Figure 2B:
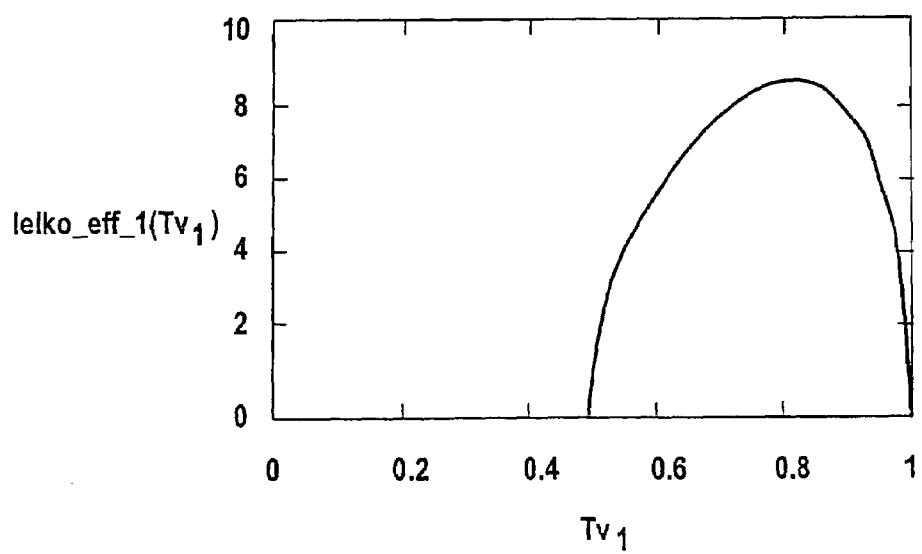

FIGS. 2A and 2B show, for pulse control factors between 0 and 1, the effective current through electrolytic capacitor 8 that is brought about by first fan motor 2 and first switching device 4. On account of the considerably different magnitude of the effective current through electrolytic capacitor 8, FIG. 2A shows the curve of effective current $I_{elko\_eff\_1}(Tv_1)$ for a pulse control factor $Tv_1$ between 0 and 0.5, and FIG. 2B shows the curve of effective current $I_{elko\_eff\_1}(Tv_1)$ for a pulse control factor $Tv_1$ between 0.5 and 1. In this context, maximum motor current $I_{mot\_max}$ is specified as 22.8 A. FIGS. 2A and 2B show the curve of the effective current through electrolytic capacitor 8 at equal pulse control factors $Tv_1$ and $Tv_2$ of the two pulse width modulation signals $S_1$, $S_2$.

It is seen that the curve of the effective current $I_{elko\_eff\_1}(Tv_1)$ achieves local minima in each case at a pulse control factor $Tv_1$ of 0, 0.5 and 1. This means that, if the fan motor is being operated at a pulse control factor $Tv_1$ of 0.5 or 1, the value of the effective current through the electrolytic capacitor 8 is minimal, in the ideal case equal to zero.

One may see that the current through electrolytic capacitor 8, at pulse control factors $Tv_1$, $Tv_2$ between 0.5 and 1 may clearly assume greater values than at pulse control factors $Tv_1$, $Tv_2$ between 0 and 0.5. One may see especially that the current is greatest at pulse control factors $Tv_1$, $Tv_2$ between 0.8 and 0.9.

Therefore, the capacitor loading at a pulse control factor $Tv_1$, $Tv_2$ of 0.5 is essentially 0, since the free-wheeling currents of the two fan motors over free-wheeling diodes 6, 7 are almost equal in each case during their free-wheeling time, and are thus constant over the entire period. Thus there is no loading or discharge of the electrolytic capacitor.

It is now provided that one should control the two fan motors 2, 3 in such a way that in each case one of fan motors 2, 3 is held to a local minimum, and the air output required beyond that, to achieve the overall air output, is brought about using the other fan motor.

For example, according to the graph in FIG. 2B, the effective current through electrolytic capacitor 8, in the case of two identical motors which are both operated at a pulse control factor $Tv_1$, $Tv_2$ of 0.55, the overall effective current through electrolytic capacitor 8 would be approximately 8 A (=2×4 A). Now, if one were to fix the pulse control factor $Tv_1$, $Tv_2$ for one of the two fan motors 2, 3 at 0.5, the respective other fan motor would have to compensate for the missing air output of the first fan motor, and would need a greater pulse control factor $Tv_1$, $Tv_2$ in order to achieve this. Even if the air output does not run proportionately to pulse control factors $Tv_1$, $Tv_2$ of fan motors 2, 3, in general it is to be expected that the required pulse control factor $Tv_2$ for second fan motor 3 does not exceed the value 0.7 (0.7=pulse control factor at 8 A=2×4 A). Using the procedure of providing the pulse width modulation signal for one of the two fan motors 2, 3 with a pulse control factor $Tv_1$, $Tv_2$, at which the effective current through electrolytic capacitor 8 has a local minimum, has the advantage that the effective current through electrolytic capacitor 8 may be reduced, without changing the air output.

In order to be able to allocate the required setpoint air output value to a first and a second pulse control factor $Tv_1$, $Tv_2$, an allocation unit 11 is provided in control unit 1, in which, according to the control method described, the first and the second pulse control factor $Tv_1$, $Tv_2$ are allocated to a prespecified setpoint air output value. The first and second pulse control factors $Tv_1$, $Tv_2$ are transmitted to a pulse width modulation unit 12, which generates pulse width modulation signals $S_1$, $S_2$.

Essentially, pulse control variables $Tv_1$, $Tv_2$ are selected so that the first pulse control factor $Tv_1$ leads to a local minimum of the current through electrolytic capacitor 8, so that the required overall air output is able to be achieved by making the selection of second pulse control factor $Tv_2$. If several local minima for the effective current through electrolytic capacitor 8 are available, the factor is selected at which the overall current through electrolytic capacitor 8 is the lowest.

Furthermore, in the case of first and second pulse width modulation signal $S_1$, $S_2$ it should be observed that the times at which both field effect power transistors 4, 5 are switched off should be held as short as possible or should be avoided altogether. If the values of the first and the second pulse control factors are both less than 0.5, the times for switching on the first and second field effect power transistor 4, 5 are set in such a way that the times for switching on do not overlap. If the pulse control factors are both greater than a value of 0.5, the times for switching on during a period are set in such a way that always at least one of field effect power transistors 4, 5 is switched through. This is of advantage, since, because of that, the voltage fluctuations on the supply lines are less than if the times of switching on the two pulse width modulation signals $S_1$, $S_2$ essentially overlap.

If the prespecified overall air output is continually changed, then, if possible, always only one of pulse control factors $Tv_1$, $Tv_2$ is changed, while the respective other pulse control factor is held to a value equivalent to a local minimum of current flow through electrolytic capacitor 8. If the pulse width modulation signal, along with the changing pulse control factor, reaches a value at which a local minimum exists for the current flow through electrolytic capacitor 8, this pulse control factor is maintained, and the pulse control factor of the previously established value is adapted corresponding to the changing prespecified setpoint air output.

In this way it may be avoided that the pulse control factors of pulse width modulation signals $S_1$, $S_2$ differ too greatly among each other, since they respectively correct each other. The functional curves shown in FIGS. 2A, 2B follow from the following equations:

$$I_{elko\_aus\_1}(Tv_1) := (Tv_1)^2 \cdot I_{mot\_max\_1}$$

and $$I_{elko\_ein\_1}(Tv_1) := (1-Tv_1) \cdot Tv_1 \cdot I_{mot\_max\_1}$$

as well as $$I_{elko\_aus\_2}(Tv_2) := (Tv_2)^2 \cdot I_{mot\_max\_2}$$

and $$I_{elko\_ein\_2}(Tv_2) := (1-Tv_2) \cdot Tv_2 \cdot I_{mot\_max\_2},$$

where $I_{elko\_aus\_1}(Tv_1)$ is the breaking current through electrolytic capacitor 8 upon the switching off of first field effect power transistor 4, $Tv_1$ is the pulse control factor of first pulse width modulation signal $S_1$, $I_{mot\_max\_1}$ is the maximum motor current of first fan motor 2, $I_{elko\_ein\_1}(Tv_1)$ is the starting current upon the switching on of first field effect power transistor 4, $I_{elko\_aus\_2}(Tv_2)$ is the breaking current through electrolytic capacitor 8 upon the switching off of second field effect power transistor 5, $Tv_2$ is the pulse control factor of second pulse width modulation signal $S_2$, $I_{mot\_max\_2}$ is the maximum motor current of second fan motor 3, and $I_{elko\_ein2}(Tv_2)$ is the starting current through electrolytic capacitor 8 based on the switching on of second field effect power transistor 5.

This yields for the effective current through electrolytic capacitor 8, on the assumption that pulse control factors $Tv_1$, $Tv_2$ are both greater than 0.5, and their current inflow phases overlap optimally:

$$I_{elko\_eff\_1}(Tv_1) = \sqrt{\frac{1}{T}\left[\begin{array}{l}\int_0^{(1-Tv_1)T}(I_{elko\_aus\_1}(Tv_1) - I_{elko\_ein\_2}(Tv_1))^2\,dt + \\ \int_{(1-Tv_1)T}^{Tv_1 T}(I_{elko\_ein\_1}(Tv_1) + I_{elko\_ein\_2}(Tv_1))^2\,dt + \\ \int_{Tv_1 T}^{T}(-I_{elko\_ein\_1}(Tv_1) + I_{elko\_aus\_2}(Tv_1))^2\,dt\end{array}\right]}$$

where T is the period duration of the pulse width modulation signal.

On the other hand, when there is not an optimal overlapping of the current inflow phases at pulse control factors $Tv_1$, $Tv_2 > 0.5$, it yields:

$$I_{elko\_eff\_1}(Tv_1) = \sqrt{\frac{1}{T}\left[\begin{array}{l}\int_0^{(1-Tv_1)T}(I_{elko\_aus\_1}(Tv_1) - I_{elko\_ein\_2}(Tv_1))^2\,dt + \\ \int_{(1-Tv_1)T}^{Tv_1 T}(I_{elko\_aus\_1}(Tv_1) + I_{elko\_aus\_2}(Tv_1))^2\,dt + \\ \int_{Tv_1 T}^{T}(-I_{elko\_ein\_1}(Tv_1) + I_{elko\_aus\_2}(Tv_1))^2\,dt\end{array}\right]}$$

Figure 3:
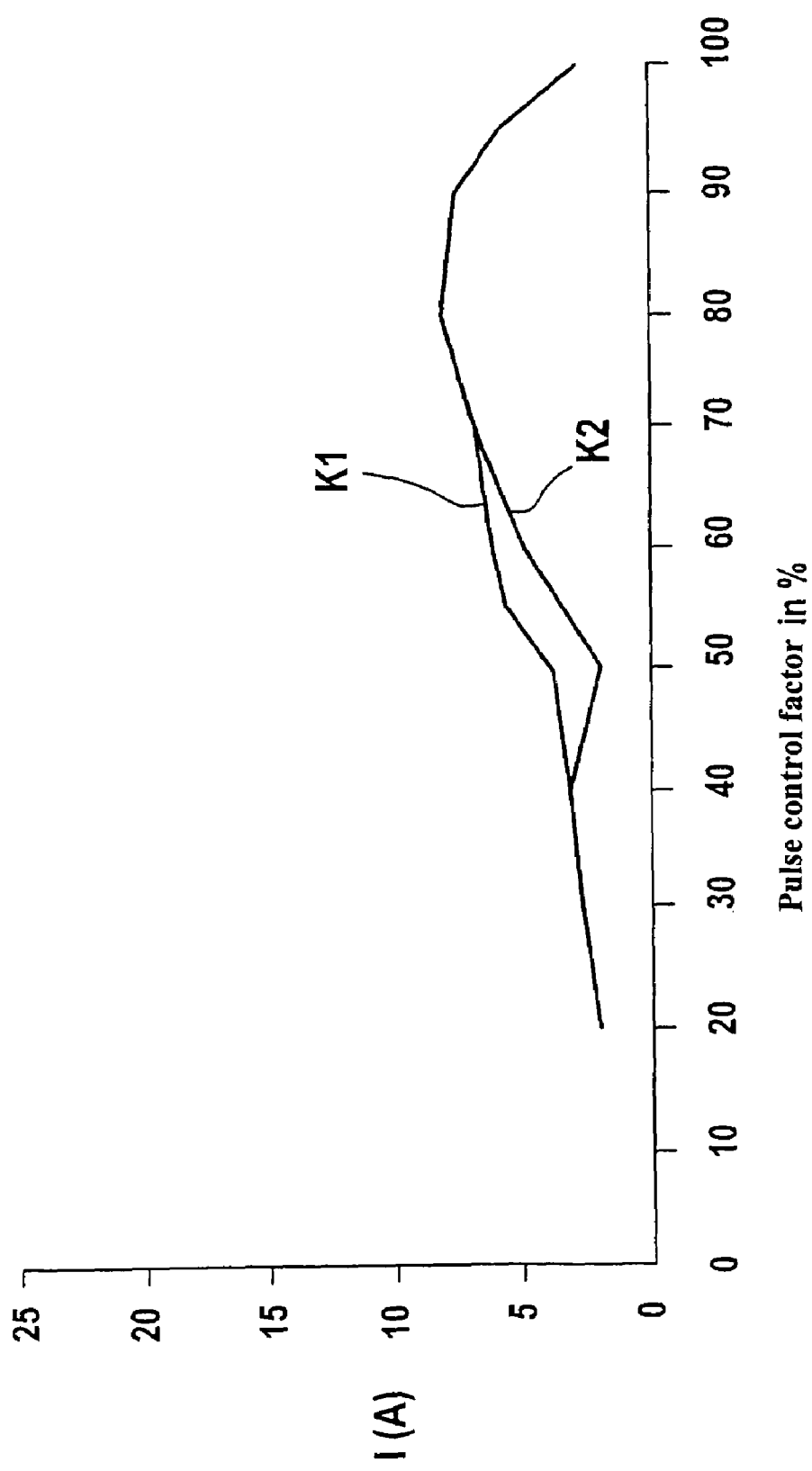
FIG. 3 a measured value diagram for the current through the capacitor component.

This is shown in the diagram in FIG. 3. One may recognize the curves of the effective current through electrolytic capacitor 8, curve K1 representing the current in the case of an overlapping of the current inflow phase that is not optimal, and curve K2 representing the current in the case of an overlapping of the current inflow phase that is optimal.

The non-optimal overlapping of the current inflow phases means that, at pulse control factors $Tv_1$, $Tv_2$ that are greater than 0.5, there are times that occur during a period duration in which both field effect power transistors 4, 5 are switched off. According to one optimal overlapping, at pulse control factors $Tv_1$, $Tv_2 > 0.5$, the switching time of the two field effect power transistors 4, 5 is set in such a way that at all times at least one of the two field effect power transistors 4, 5 is switched through. At pulse control factors $Tv_1$, $Tv_2 < 0.5$, the times at which field effect power transistors 4, 5 are switched through are not set to be overlapping, if at all possible, in order to minimize as much as possible the time during which neither of the two field effect power transistors 4, 5 are switched through. This is used to hold the voltage fluctuations on the supply lines to as low a value as possible.

One may see from FIG. 3 that the effective current through electrolytic capacitor 8 at pulse control factors $Tv_1$, $Tv_2$, that lie between 0.4 and 0.7, is clearly less if, because of the turn-on time of the field effect power transistors 4, 5, as few as possible or no pauses are created, during which none of the field effect power transistors 4, 5 are switched through.

What is claimed is:

1. A method for controlling a first fan motor and a second fan motor, comprising:

controlling the first fan motor with a first pulse width modulation signal having a first pulse control factor;

controlling the second fan motor with a second pulse width modulation signal having a second pulse control factor;

adjusting an overall air output produced by an operation of at least one of the first fan motor and the second fan motor according to a prespecified setpoint air output;

smoothing out a voltage fluctuation in a voltage supply line via a low-pass filter connected to the first fan motor and the second fan motor; and adjusting to each other at least two of a position in time of the first pulse width modulation signal, a position in time of the second pulse width modulation signal, the first pulse control factor, and the second pulse control factor, so that, at a given overall setpoint air output, an effective value of a current is minimized by the low-pass filter;

wherein:

a current through the low-pass filter in each case has local minima at certain values of the first pulse control factor and the second pulse control factor, a value of the first pulse control factor is established for one of the local minima, for setting the setpoint air output, and the second pulse control factor is selected such that the overall air output is achieved; and further comprising selecting the first pulse control factor, at which the current through the low-pass filter has a local minimum, such that the value of the first pulse control factor has as small a difference as possible from the value of the second pulse control factor.

2. The method as recited in claim 1, further comprising:

in response to a continual change in the setpoint air output, changing a value of the first pulse control factor;

holding a value of the second pulse control factor to a certain pulse control factor, at which a current through the low-pass filter has a local minimum; and after reaching a local minimum by the first pulse control factor, holding the first pulse control factor to the local minimum reached and changing the second pulse control factor in a manner corresponding to the change in the setpoint air output.

3. A control unit for controlling a first fan motor and a second fan motor, comprising:

an arrangement for controlling the first fan motor according to a first pulse width modulation signal having a first pulse control factor;

an arrangement for controlling the second fan motor according to a second pulse width modulation signal having a second pulse control factor;

an arrangement for receiving a setpoint air output;

an arrangement for generating the first pulse width modulation signal and the second pulse width modulation signal;

a low-pass filter for the first fan motor and the second fan motor in order to smooth out a voltage fluctuation in a voltage supply line; and an arrangement for adjusting to each other at least two of a position in time of the first pulse width modulation signal, a position in time of the second pulse width modulation signal, the first pulse control factor, and the second pulse control factor, so that, at a given overall setpoint air output, an effective value of a current is minimized by the low-pass filter;

wherein:

a current through the low-pass filter has local minima at certain values of the first pulse control factor and the second pulse control factor, a value of the first pulse control factor is established for one of the local minima, for setting the setpoint air output, and the second pulse control factor is selected such that the overall air output is achieved; and further comprising:

an arrangement for selecting the first pulse control factor, at which the current through the low-pass filter has a local minimum, in such a way that the value of the first pulse control factor has as small a difference as possible from the value of the second pulse control factor.

4. The control unit as recited in claim 3, further comprising:

an allocation device in which the first pulse control factor and the second pulse control factor are allocated to each setpoint air output value.

5. The control unit as recited in claim 3, further comprising:

an arrangement for, in response to a continual change in the setpoint air output, changing a value of the first pulse control factor;

an arrangement for holding a value of the second pulse control factor to a certain pulse control factor, at which a current through the low-pass filter has a local minimum; and an arrangement for, after reaching a local minimum by the first pulse control factor, holding the first pulse control factor to the local minimum reached and changing the second pulse control factor in a manner corresponding to the change in the setpoint air output.

\* \* \* \* \*